US012567682B2

(12) United States Patent
Zhou et al.

(10) Patent No.: US 12,567,682 B2
(45) Date of Patent: Mar. 3, 2026

(54) COMPACT MULTIBAND OPEN-ENDED SLOT DIPOLE ANTENNA FOR A NEAR-EYE DEVICE

(71) Applicant: Meta Platforms Technologies, LLC, Menlo Park, CA (US)

(72) Inventors: Tao Zhou, San Jose, CA (US); Umar Azad, San Jose, CA (US); Peter Eli Renner, San Jose, CA (US); Eswarappa Channabasappa, Milpitas, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 57 days.

(21) Appl. No.: 18/609,830

(22) Filed: Mar. 19, 2024

(65) Prior Publication Data

US 2024/0356243 A1 Oct. 24, 2024

Related U.S. Application Data

(60) Provisional application No. 63/460,372, filed on Apr. 19, 2023.

(51) Int. Cl.
| | |
|---|---|
| *H01Q 21/30* | (2006.01) |
| *G02B 27/01* | (2006.01) |
| *G02C 11/00* | (2006.01) |
| *H01Q 1/38* | (2006.01) |

(52) U.S. Cl.
CPC ......... *H01Q 21/30* (2013.01); *G02B 27/0176* (2013.01); *G02C 11/10* (2013.01); *H01Q 1/38* (2013.01); *G02B 2027/0178* (2013.01)

(58) Field of Classification Search
CPC ........... H01Q 21/30; H01Q 1/38; G02C 11/10
See application file for complete search history.

(56) References Cited

U.S. PATENT DOCUMENTS

| | | |
|---|---|---|
| 7,053,844 B2 | 5/2006 | Gaucher et al. |
| 8,854,270 B2 | 10/2014 | Lee et al. |
| 2022/0102861 A1 | 3/2022 | Hwang |

OTHER PUBLICATIONS

Deshmukh A.A., et al., "Psi-Shaped Ultra-Wideband Monopole Antenna with a Modified Feeding Structure," Procedia Computer Science, Jan. 1, 2016, vol. 93, pp. 60-66.
Lin K., et al., "Simple Printed Multiband Antenna with Novel Parasitic-Element Design for Multistandard Mobile Phone Applications," IEEE Transactions on Antennas and Propagation, Jan. 2013, vol. 61, No. 01, pp. 488-491.
Wang Y., et al., "Sub-6GHZ 4G/5G Conformal Glasses Antennas," IEEE Access, Dec. 26, 2019, vol. 07, pp. 182027-182036.

*Primary Examiner* — Graham P Smith
(74) *Attorney, Agent, or Firm* — Morgan, Lewis & Bockius LLP

(57) ABSTRACT

Antenna systems for near-eye devices are described which include multiple resonance sections fed by a single parasitic element. In one example, an antenna has multiple resonance sections which include an open-ended slot antenna section that resonates within a 2.4 GHz frequency band. In one example, the antenna has a monopole section and a dipole section which both resonate within a 5 GHz to 7 GHz frequency band. In one example, a floating dipole is created by locating an open-ended slot antenna parallel to a monopole antenna, where both antennas share the same electrical feed. In one example, multiple resonance sections on one side of a printed circuit board (PCB) are simultaneously electrically fed by a single parasitic element on the other side of the PCB.

20 Claims, 16 Drawing Sheets

200A

200

FRONT SIDE 225

BODY 220

DISPLAY 210

BOTTOM SIDE 223

HEAD STRAP 230

ANTENNA 240

RIGHT SIDE 229

500C

S-PARAMETERS [IMPEDANCE VIEW]

○ 0 (6.52e+04, 0) Ohm

● 8 (270, 107) Ohm

FREQUENCY / GHz

⊙₁   2.400000 ( 18.186989, -2.134400 ) Ohm

⊙₂   2.500000 ( 38.419880, 47.562339 ) Ohm

⊙₃   5.000000 ( 17.549489, -8.721957 ) Ohm

⊙₄   6.000000 ( 38.433586, -35.768659 ) Ohm

⊙₅   7.000000 ( 29.057066, 17.646049 ) Ohm 2.45GHz 5.4GHz 7.4GHz >> 6.8GHz

COMPACT MULTIBAND OPEN-ENDED SLOT DIPOLE ANTENNA FOR A NEAR-EYE DEVICE

CROSS REFERENCE TO OTHER APPLICATIONS

This application claims priority to U.S. Prov. Pat. App. Ser. No. 63/460,372, entitled COMPACT MULTIBAND OPEN-ENDED SLOT DIPOLE ANTENNA FOR A NEAR-EYE DISPLAY DEVICE and filed on Apr. 19, 2023, the entire contents of which are incorporated by reference.

TECHNICAL FIELD

This patent application relates generally to wearable devices, and in particular, a compact multiband antenna system to enable wireless communication in multiple frequency bands for a near-eye display device.

BACKGROUND

With recent advances in technology, prevalence and proliferation of content creation and delivery has increased greatly in recent years. In particular, interactive content such as virtual reality (VR) content, augmented reality (AR) content, mixed reality (MR) content, and content within and associated with a real and/or virtual environment (e.g., a "metaverse") has become appealing to consumers.

Wearable devices, such as augmented reality (AR) eyewear or glasses, may include a number of communication subsystems for wireless communication with other devices or networks at varying frequency bands. Providing an antenna system to enable wireless communication at different frequencies with efficiency and within safety limits may be challenging given size limitations on the near-eye display device.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

DETAILED DESCRIPTION

Figure 1:
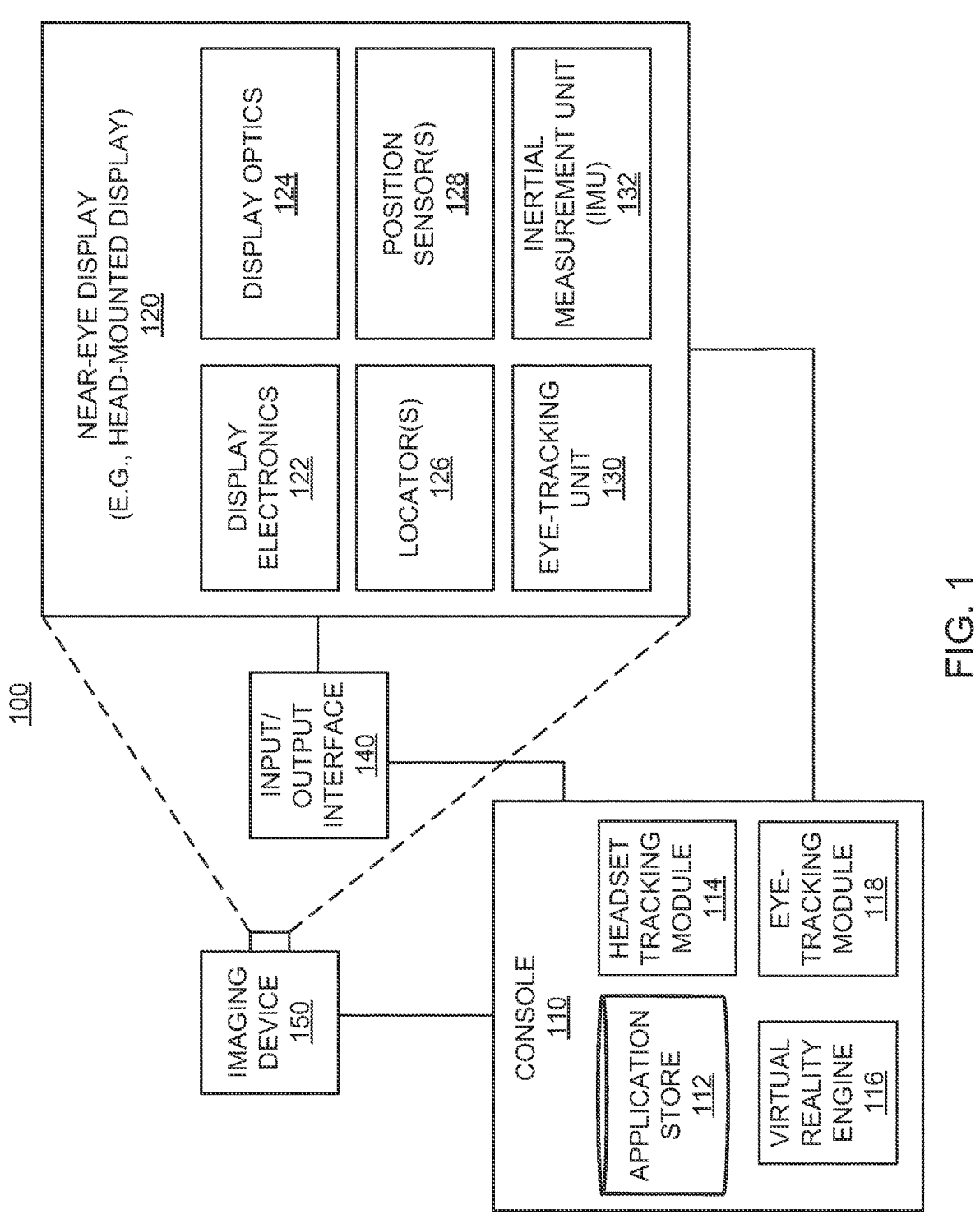
FIG. 1 illustrates a block diagram of an artificial reality system environment including a near-eye display, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

Wearable devices such as near-eye devices, including head-mounted display (HMD) devices and other near-eye display devices (such as, e.g., smartglasses), smart watches, handheld controllers, and similar ones are part of the metaverse, where interactive content such as virtual reality (VR) content, augmented reality (AR) content, and/or mixed reality (MR) content may be provided to users. One challenge with wearable devices is available power. To avoid being tethered to another device for communication, a wearable device may include one or more on-board wireless communication subsystems. However, antenna(s) of such wireless communication subsystems may be subject to size and performance limitations.

Accordingly, near-eye devices, including near-eye display devices such as augmented reality (AR)/virtual reality (VR) display devices and/or glasses, may contain a number of subsystems directed to various applications. Some of those may include wireless communication systems. For example, the near-eye device may communicate wirelessly with a console as discussed in conjunction with FIG. 1. The near-eye display device may also be configured to communicate with a wireless network such as a WiFi network or comparable ones. The wireless communications may be near-field, far-field, etc. Thus, various frequency bands may be used for the wireless communications. In addition to the communication circuitry (e.g., transceivers), the wireless communication subsystems may include antennas to operate in various frequency bands such as 2.4 GHZ, 5 GHZ, 6 GHZ, etc.

The present disclosure describes an antenna system for wearable devices such as near-eye devices, including near-eye display devices, such as augmented reality (AR)/virtual reality (VR) display devices and/or glasses, which may include multiple resonance sections that are fed by a single parasitic element. The multiple resonance sections may include an open-ended slot antenna section that resonates within 2.4 GHz frequency band, for example. The antenna system may also include a monopole antenna section that resonates within a high frequency band (HB) of 5 GHz to 7 GHZ, and a dipole antenna section that also resonates within the high frequency band (HB), for example. The dipole antenna may be arranged as a floating dipole that is created by locating the open-ended slot antenna parallel to the monopole antenna, and by having them share the same electrical feed. The multiple resonance sections may be simultaneously electrically fed via a coupling with a single parasitic element. In some examples, the antenna resonance sections may be formed on one surface of a printed circuit board (PCB), while the parasitic feed is formed on an opposite surface of the printed circuit board (PCB).

While some advantages and benefits of the present disclosure are apparent, other advantages and benefits may include increased wireless communication range and efficiency, reduced specific absorption rate (SAR) for safety of users, and/or reduced size for enhanced industrial design of near-eye devices, such as near-eye display devices, including augmented reality (AR)/virtual reality (VR) display devices and/or glasses.

FIG. 1 illustrates a block diagram of an artificial reality system environment 100 including a near-eye display device, according to an example. As used herein, a "near-eye device" may refer to a device (e.g., an optical device) that may be in close proximity to a user's eye, whereas a "near-eye display device" may refer to a near-eye which may display images for the user's eye, such as, e.g., virtual reality (VR), augmented reality (AR), and/or mixed reality (MR) images. As used herein, "artificial reality" may refer to aspects of, among other things, a "metaverse" or an environment of real and virtual elements and may include use of technologies associated with virtual reality (VR), augmented reality (AR), and/or mixed reality (MR). As used herein a "user" may refer to a user or wearer of a "near-eye display device."

As shown in FIG. 1, the artificial reality system environment 100 may include a near-eye display device 120, an optional external imaging device 150, and an optional input/output interface 140, each of which may be coupled to a console 110. The console 110 may be optional in some instances as the functions of the console 110 may be integrated into the near-eye display device 120. In some examples, the near-eye display device 120 may be a head-mounted display (HMD) that presents content to a user.

In some instances, for a near-eye display device, it may generally be desirable to expand an eye box, reduce display haze, improve image quality (e.g., resolution and contrast), reduce physical size, increase power efficiency, and increase or expand field of view (FOV). As used herein, "field of view" (FOV) may refer to an angular range of an image as seen by a user, which is typically measured in degrees as observed by one eye (for a monocular head-mounted display (HMD)) or both eyes (for binocular head-mounted displays (HMDs)). Also, as used herein, an "eye box" may be a two-dimensional box that may be positioned in front of the user's eye from which a displayed image from an image source may be viewed.

In some examples, in a near-eye display device, light from a surrounding environment may traverse a "see-through" region of a waveguide display (e.g., a transparent substrate) to reach a user's eyes. For example, in a near-eye display device, light of projected images may be coupled into a transparent substrate of a waveguide, propagate within the waveguide, and be coupled or directed out of the waveguide at one or more locations to replicate exit pupils and expand the eye box.

In some examples, the near-eye display device 120 may include one or more rigid bodies, which may be rigidly or non-rigidly coupled to each other. In some examples, a rigid coupling between rigid bodies may cause the coupled rigid bodies to act as a single rigid entity, while in other examples, a non-rigid coupling between rigid bodies may allow the rigid bodies to move relative to each other.

In some examples, the near-eye display device 120 may be implemented in any suitable form-factor, including a head-mounted display (HMD), a pair of glasses, or other similar wearable eyewear or device. Examples of the near-eye display device 120 are further described below with respect to FIGS. 2 and 3. Additionally, in some examples, the functionality described herein may be used in a head-mounted display (HMD) or headset that may combine images of an environment external to the near-eye display device 120 and artificial reality content (e.g., computer-generated images). Therefore, in some examples, the near-eye display device 120 may augment images of a physical, real-world environment external to the near-eye display device 120 with generated and/or overlaid digital content (e.g., images, video, sound, etc.) to present an augmented reality to a user.

In some examples, the near-eye display device 120 may include any number of display electronics 122, display optics 124, and an eye tracking unit 130. In some examples, the near-eye display device 120 may also include one or more locators 126, one or more position sensors 128, and an inertial measurement unit (IMU) 132. In some examples, the near-eye display device 120 may omit any of the eye tracking unit 130, the one or more locators 126, the one or more position sensors 128, and the inertial measurement unit (IMU) 132, or may include additional elements.

In some examples, the display electronics 122 may display or facilitate the display of images to the user according to data received from, for example, the optional console 110. In some examples, the display electronics 122 may include one or more display panels. In some examples, the display electronics 122 may include any number of pixels to emit light of a predominant color such as red, green, blue, white, or yellow. In some examples, the display electronics 122 may display a three-dimensional (3D) image, e.g., using stereoscopic effects produced by two-dimensional panels, to create a subjective perception of image depth.

In some examples, the near-eye display device 120 may include a projector (not shown), which may form an image in angular domain for direct observation by a viewer's eye through a pupil. The projector may employ a controllable light source (e.g., a laser source) and a micro-electromechanical system (MEMS) beam scanner to create a light field from, for example, a collimated light beam. In some examples, the same projector or a different projector may be used to project a fringe pattern on the eye, which may be captured by a camera and analyzed (e.g., by the eye tracking unit 130) to determine a position of the eye (the pupil), a gaze, etc.

In some examples, the display optics 124 may display image content optically (e.g., using optical waveguides and/or couplers) or magnify image light received from the display electronics 122, correct optical errors associated with the image light, and/or present the corrected image light to a user of the near-eye display device 120. In some examples, the display optics 124 may include a single optical element or any number of combinations of various optical elements as well as mechanical couplings to maintain relative spacing and orientation of the optical elements in the combination. In some examples, one or more optical elements in the display optics 124 may have an optical coating, such as an anti-reflective coating, a reflective coating, a filtering coating, and/or a combination of different optical coatings.

In some examples, the display optics 124 may also be designed to correct one or more types of optical errors, such as two-dimensional optical errors, three-dimensional optical errors, or any combination thereof. Examples of two-dimensional errors may include barrel distortion, pincushion distortion, longitudinal chromatic aberration, and/or transverse chromatic aberration. Examples of three-dimensional errors may include spherical aberration, chromatic aberration field curvature, and astigmatism.

In some examples, the one or more locators 126 may be objects located in specific positions relative to one another and relative to a reference point on the near-eye display device 120. In some examples, the optional console 110 may identify the one or more locators 126 in images captured by the optional external imaging device 150 to determine the artificial reality headset's position, orientation, or both. The one or more locators 126 may each be a light-emitting diode (LED), a corner cube reflector, a reflective marker, a type of light source that contrasts with an environment in which the near-eye display device 120 operates, or any combination thereof.

In some examples, the external imaging device 150 may include one or more cameras, one or more video cameras, any other device capable of capturing images including the one or more locators 126, or any combination thereof. The optional external imaging device 150 may be configured to detect light emitted or reflected from the one or more locators 126 in a field of view of the optional external imaging device 150.

In some examples, the one or more position sensors 128 may generate one or more measurement signals in response to motion of the near-eye display device 120. Examples of the one or more position sensors 128 may include any number of accelerometers, gyroscopes, magnetometers, and/or other motion-detecting or error-correcting sensors, or any combination thereof.

In some examples, the inertial measurement unit (IMU) 132 may be an electronic device that generates fast calibration data based on measurement signals received from the one or more position sensors 128. The one or more position sensors 128 may be located external to the inertial measurement unit (IMU) 132, internal to the inertial measurement unit (IMU) 132, or any combination thereof. Based on the one or more measurement signals from the one or more position sensors 128, the inertial measurement unit (IMU) 132 may generate fast calibration data indicating an estimated position of the near-eye display device 120 that may be relative to an initial position of the near-eye display device 120. For example, the inertial measurement unit (IMU) 132 may integrate measurement signals received from accelerometers over time to estimate a velocity vector and integrate the velocity vector over time to determine an estimated position of a reference point on the near-eye display device 120. Alternatively, the inertial measurement unit (IMU) 132 may provide the sampled measurement signals to the optional console 110, which may determine the fast calibration data.

In some examples, the near-eye display device 120 may use the orientation of the eye to introduce depth cues (e.g., blur image outside of the user's main line of sight), collect heuristics on the user interaction in the virtual reality (VR) media (e.g., time spent on any particular subject, object, or frame as a function of exposed stimuli), some other functions that are based in part on the orientation of at least one of the user's eyes, or any combination thereof. In some examples, because the orientation may be determined for both eyes of the user, the eye tracking unit 130 may be able to determine where the user is looking or predict any user patterns, etc.

In some examples, the input/output interface 140 may be a device that allows a user to send action requests to the optional console 110. As used herein, an "action request" may be a request to perform a particular action. For example, an action request may be to start or to end an application or to perform a particular action within the application. The input/output interface 140 may include one or more input devices. Example input devices may include a keyboard, a mouse, a game controller, a glove, a button, a touch screen, or any other suitable device for receiving action requests and communicating the received action requests to the optional console 110. In some examples, an action request received by the input/output interface 140 may be communicated to the optional console 110, which may perform an action corresponding to the requested action.

In some examples, the optional console 110 may provide content to the near-eye display device 120 for presentation to the user in accordance with information received from one or more of external imaging device 150, the near-eye display device 120, and the input/output interface 140. For example, in the example shown in FIG. 1, the optional console 110 may include an application store 112, a headset tracking module 114, a virtual reality engine 116, and an eye tracking module 118. Some examples of the optional console 110 may include different or additional modules than those described in conjunction with FIG. 1. Functions further described below may be distributed among components of the optional console 110 in a different manner than is described here.

In some examples, the optional console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In some examples, the modules of the optional console 110 described in conjunction with FIG. 1 may be encoded as instructions in the non-transitory computer-readable storage medium that, when executed by the processor, cause the processor to perform the functions further described below. It should be appreciated that the optional console 110 may or may not be needed or the optional console 110 may be integrated with or separate from the near-eye display device 120.

In some examples, the application store 112 may store one or more applications for execution by the optional console 110. An application may include a group of instructions that, when executed by a processor, generates content for presentation to the user. Examples of the applications may include gaming applications, conferencing applications, video playback application, or other suitable applications.

In some examples, the headset tracking module 114 may track movements of the near-eye display device 120 using slow calibration information from the external imaging device 150. For example, the headset tracking module 114 may determine positions of a reference point of the near-eye display device 120 using observed locators from the slow calibration information and a model of the near-eye display device 120. Additionally, in some examples, the headset tracking module 114 may use portions of the fast calibration information, the slow calibration information, or any combination thereof, to predict a future location of the near-eye display device 120. In some examples, the headset tracking module 114 may provide the estimated or predicted future position of the near-eye display device 120 to the virtual reality engine 116.

In some examples, the virtual reality engine 116 may execute applications within the artificial reality system environment 100 and receive position information of the near-eye display device 120, acceleration information of the near-eye display device 120, velocity information of the near-eye display device 120, predicted future positions of the near-eye display device 120, or any combination thereof from the headset tracking module 114. In some examples, the virtual reality engine 116 may also receive estimated eye position and orientation information from the eye tracking module 118. Based on the received information, the virtual reality engine 116 may determine content to provide to the near-eye display device 120 for presentation to the user.

In some examples, the eye tracking module 118, which may be implemented as a processor, may receive eye tracking data from the eye tracking unit 130 and determine the position of the user's eye based on the eye tracking data. In some examples, the position of the eye may include an eye's orientation, location, or both relative to the near-eye display device 120 or any element thereof. So, in these examples, because the eye's axes of rotation change as a function of the eye's location in its socket, determining the eye's location in its socket may allow the eye tracking module 118 to more accurately determine the eye's orientation.

In some examples, a location of a projector of a display system may be adjusted to enable any number of design modifications. For example, in some instances, a projector may be located in front of a viewer's eye (i.e., "front-mounted" placement). In a front-mounted placement, in some examples, a projector of a display system may be located away from a user's eyes (i.e., "world-side"). In some examples, a head-mounted display (HMD) device may utilize a front-mounted placement to propagate light towards a user's eye(s) to project an image.

In some examples, one or more of the subsystems discussed in conjunction with FIG. 1 may communicate wirelessly with other devices or systems (e.g., console 110 and near-eye display device 120, input/output interface 140 and external communication networks, etc.). To accommodate such communications, an antenna system with multiple resonance sections fed by a single parasitic element may be included in the near-eye display device 120. The multiple resonance sections may include an open-ended slot antenna section that resonates within 2.4 GHz frequency band, for example. The antenna system may also include a monopole antenna section that resonates within a high frequency band (HB) of 5 GHz to 7 GHZ, and a dipole antenna section that also resonates within the high frequency band (HB), for example. The dipole antenna may be arranged as a floating dipole that is created by locating the open-ended slot antenna parallel to the monopole antenna, and by having them share the same electrical feed. The multiple resonance sections may be simultaneously electrically fed via a coupling with a single parasitic element.

Figure 2A:
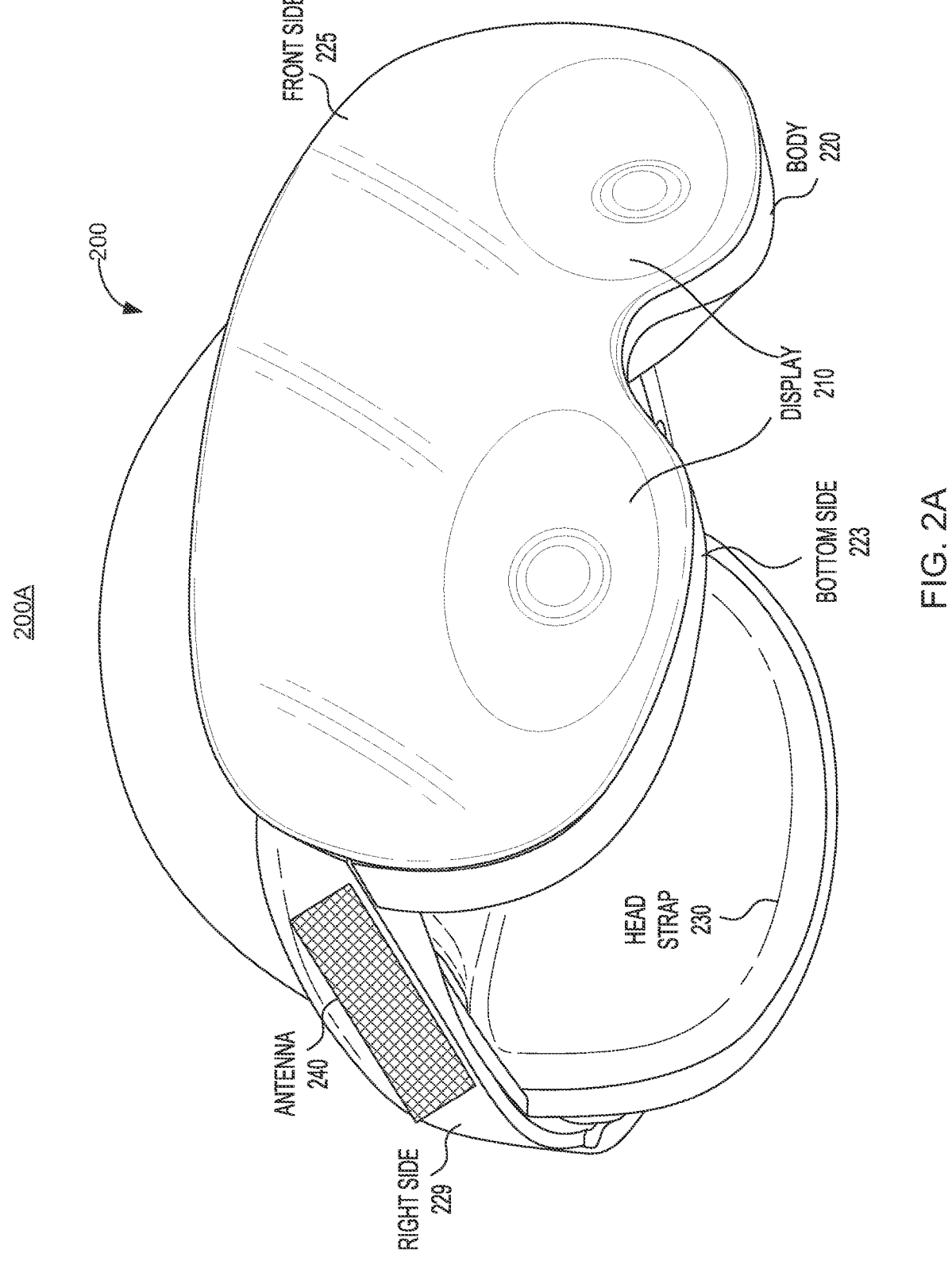
FIGS. 2A-2C illustrate various views of a near-eye display device in the form of a head-mounted display (HMD) device, according to examples.
Figure 2B:
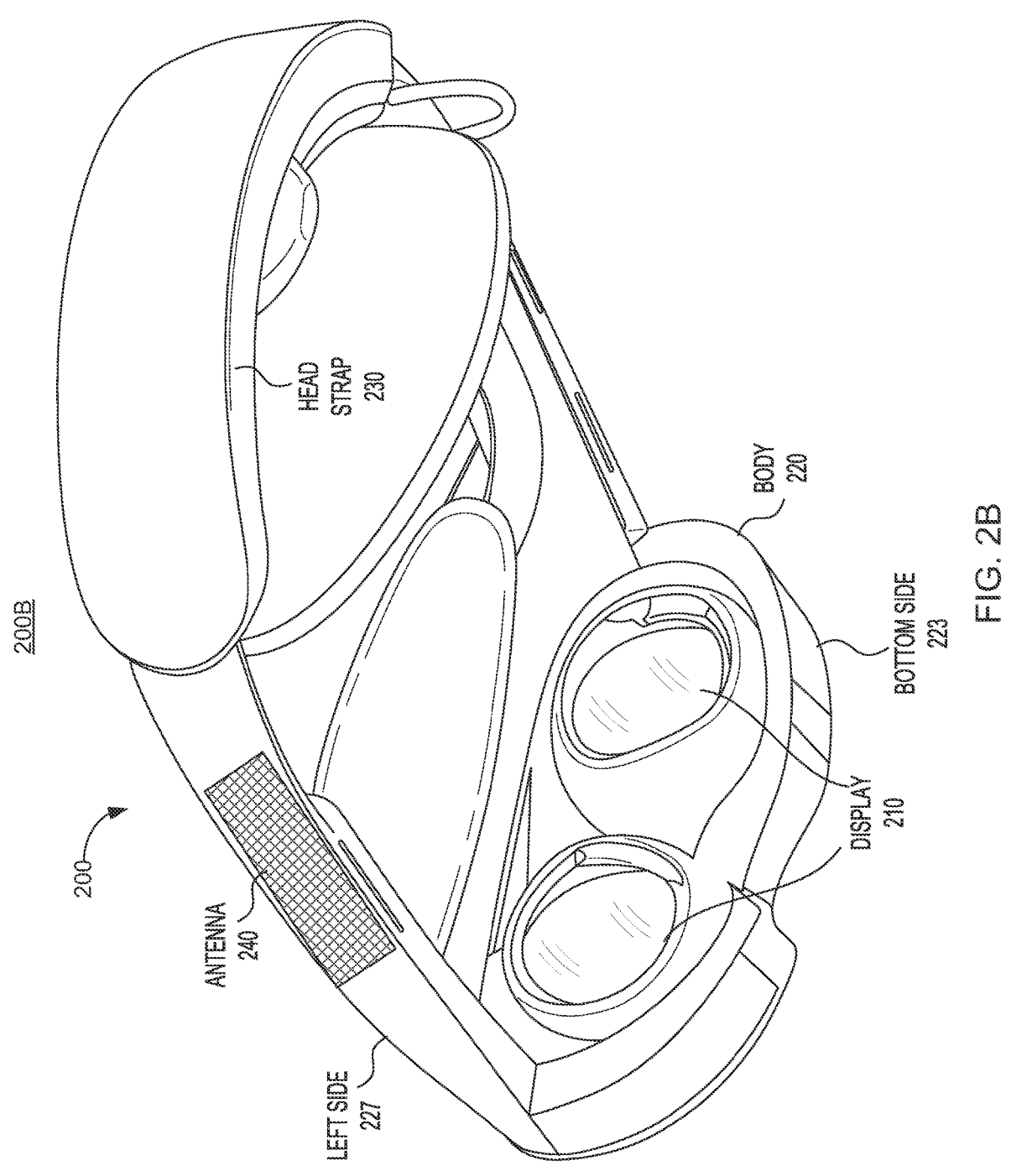
Figure 2C:
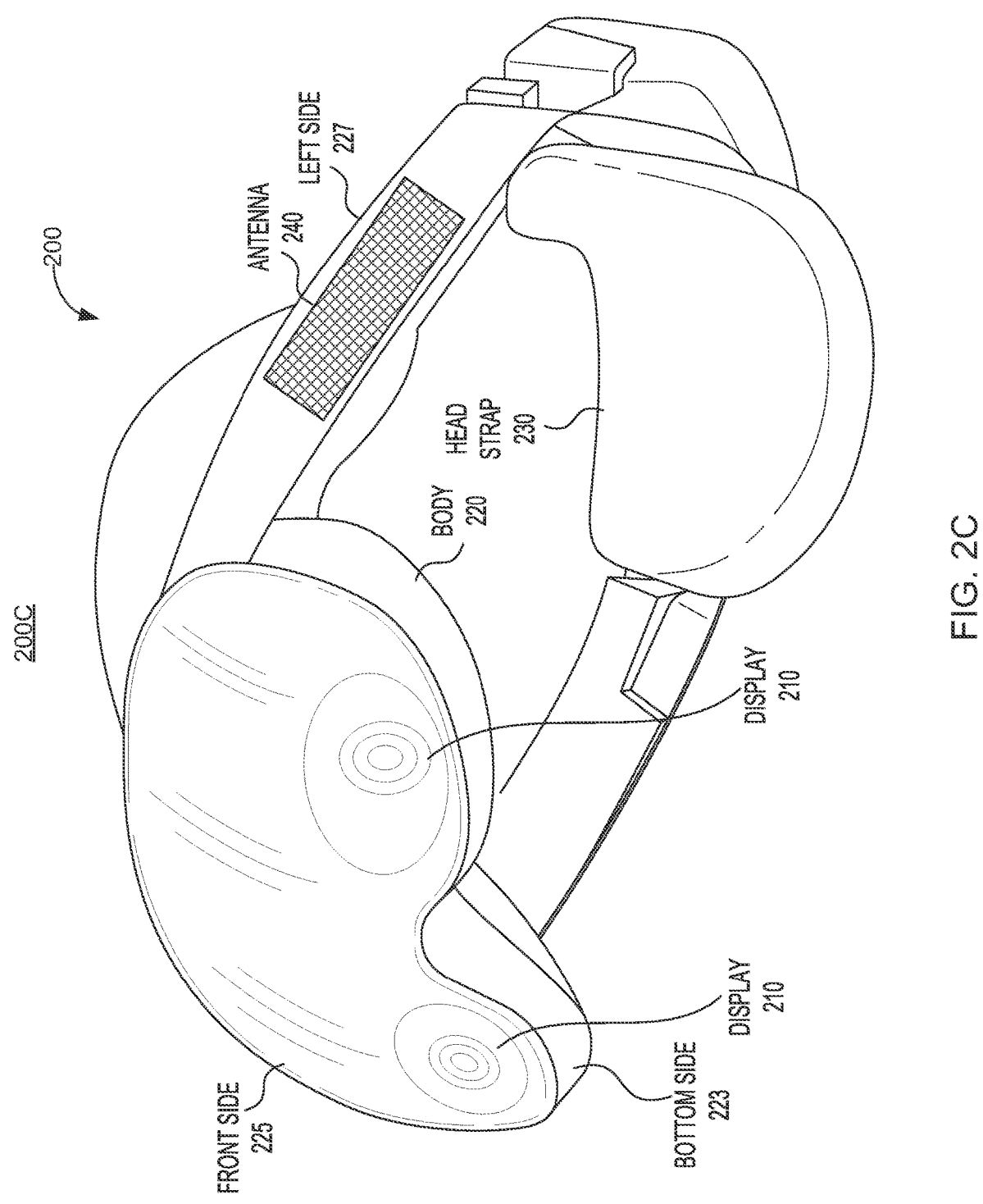

FIGS. 2A-2C illustrate various views of a near-eye display device in the form of a head-mounted display (HMD) device 200, according to examples. In some examples, the head-mounted device (HMD) device 200 may be a part of a virtual reality (VR) system, an augmented reality (AR) system, a mixed reality (MR) system, another system that uses displays or wearables, or any combination thereof. As shown in diagram 200A of FIG. 2A, the head-mounted display (HMD) device 200 may include a body 220 and a head strap 230. The front perspective view of the head-mounted display (HMD) device 200 further shows a bottom side 223, a front side 225, and a right side 229 of the body 220. In some examples, the head strap 230 may have an adjustable or extendible length. In particular, in some examples, there may be a sufficient space between the body 220 and the head strap 230 of the head-mounted display (HMD) device 200 for allowing a user to mount the head-mounted display (HMD) device 200 onto the user's head. For example, the length of the head strap 230 may be adjustable to accommodate a range of user head sizes. In some examples, the head-mounted display (HMD) device 200 may include additional, fewer, and/or different components such as a display 210 to present a wearer augmented reality (AR)/virtual reality (VR) content and a camera to capture images or videos of the wearer's environment.

As shown in the bottom perspective view of diagram 200B of FIG. 2B, the display 210 may include one or more display assemblies and present, to a user (wearer), media or other digital content including virtual and/or augmented views of a physical, real-world environment with computer-generated elements. Examples of the media or digital content presented by the head-mounted display (HMD) device 200 may include images (e.g., two-dimensional (2D) or three-dimensional (3D) images), videos (e.g., 2D or 3D videos), audio, or any combination thereof. In some examples, the user may interact with the presented images or videos through eye tracking sensors enclosed in the body 220 of the head-mounted display (HMD) device 200. The eye tracking sensors may also be used to adjust and improve quality of the presented content.

In some examples, the head-mounted display (HMD) device 200 may include an antenna system 240 located, for example, on an outside surface of the right side 229 or the left side 227 as shown in diagram 200A, 200B, and 200C. The antenna system 240 may include multiple resonance sections that are fed by a single parasitic element. The multiple resonance sections may include an open-ended slot antenna section that resonates within 2.4 GHz frequency band, for example. The antenna system may also include a monopole antenna section that resonates within a high frequency band (HB) of 5 GHz to 7 GHZ, and a dipole antenna section that also resonates within the high frequency band (HB), for example. The dipole antenna may be arranged as a floating dipole that is created by locating the open-ended slot antenna parallel to the monopole antenna, and by having them share the same electrical feed. The multiple resonance sections may be simultaneously electrically fed via a coupling with a single parasitic element.

In some examples, the head-mounted display (HMD) device 200 may include various sensors (not shown), such as depth sensors, motion sensors, position sensors, and/or eye tracking sensors. Some of these sensors may use any number of structured or unstructured light patterns for sensing purposes. In some examples, the head-mounted display (HMD) device 200 may include an input/output interface for communicating with a console communicatively coupled to the head-mounted display (HMD) device 200 through wired or wireless means. In some examples, the head-mounted display (HMD) device 200 may include a virtual reality engine (not shown) that may execute applications within the head-mounted display (HMD) device 200 and receive depth information, position information, acceleration information, velocity information, predicted future positions, or any combination thereof of the head-mounted display (HMD) device 200 from the various sensors.

In some examples, the information received by the virtual reality engine may be used for producing a signal (e.g., display instructions) to the display 210. In some examples, the head-mounted display (HMD) device 200 may include locators (not shown), which may be located in fixed positions on the body 220 of the head-mounted display (HMD) device 200 relative to one another and relative to a reference point. Each of the locators may emit light that is detectable by an external imaging device. This may be useful for the purposes of head tracking or other movement/orientation. It should be appreciated that other elements or components may also be used in addition or in lieu of such locators.

Figure 3A:
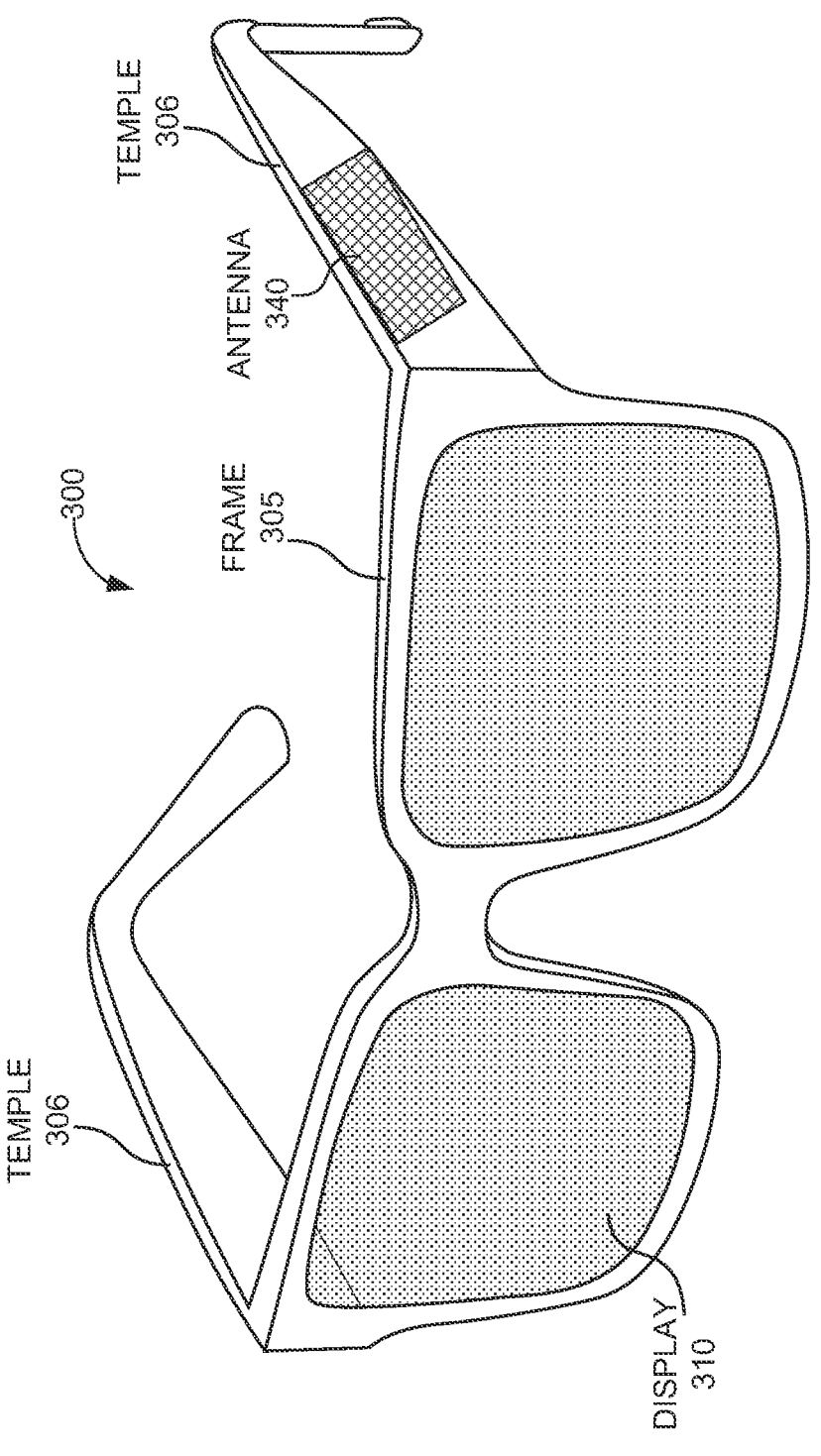
FIGS. 3A and 3B illustrate a perspective view and a top view of a near-eye display in the form of a pair of glasses, according to an example.

FIG. 3A is a perspective view of a near-eye display device 300 in the form of a pair of glasses (or other similar eyewear), according to an example. In some examples, the near-eye display device 300 may be a specific example of near-eye display device 120 of FIG. 1 and may be configured to operate as a virtual reality display, an augmented reality (AR) display, and/or a mixed reality (MR) display.

In some examples, the near-eye display device 300 may include a frame 305, two temples 306, and a display 310. In some examples, the display 310 may be configured to present media or other content to a user. In some examples, the display 310 may include display electronics and/or display optics, similar to components described with respect to FIGS. 1-2. For example, as described above with respect to the near-eye display device 120 of FIG. 1, the display 310 may include a liquid crystal display (LCD) display panel, a light-emitting diode (LED) display panel, or an optical display panel (e.g., a waveguide display assembly). In some examples, the display 310 may also include any number of optical components, such as waveguides, gratings, lenses, mirrors, etc. In other examples, the display 310 may include a projector, or in place of the display 310 the near-eye display device 300 may include a projector.

In some examples, the near-eye display device 300 may further include various sensors on or within a frame 305. In some examples, the various sensors may include any number of depth sensors, motion sensors, position sensors, inertial sensors, and/or ambient light sensors, as shown. In some examples, the various sensors may include any number of image sensors configured to generate image data representing different fields of views in one or more different directions. In some examples, the various sensors may be used as input devices to control or influence the displayed content of the near-eye display device, and/or to provide an interactive virtual reality (VR), augmented reality (AR), and/or mixed reality (MR) experience to a user of the near-eye display device 300. In some examples, the various sensors may also be used for stereoscopic imaging or other similar applications.

In some examples, the near-eye display device 300 may further include one or more illuminators to project light into a physical environment. The projected light may be associated with different frequency bands (e.g., visible light, infra-red light, ultra-violet light, etc.), and may serve various purposes. In some examples, the one or more illuminator(s) may be used as locators, such as the one or more locators 126 described above with respect to FIGS. 1-2.

In some examples, the near-eye display device 300 may also include a camera or other image capture unit. The camera, for instance, may capture images of the physical environment in the field of view. In some instances, the captured images may be processed, for example, by a virtual reality engine (e.g., the virtual reality engine 116 of FIG. 1)

to add virtual objects to the captured images or modify physical objects in the captured images, and the processed images may be displayed to the user by the display 310 for augmented reality (AR) and/or mixed reality (MR) applications. The near-eye display device 300 may also include an eye tracking camera.

In some examples, the near-eye display device 300 may include an antenna system 240 located, for example, on an outside surface of one or both of the temples 306 as shown in diagram 300A. The antenna system 340 may include multiple resonance sections that are fed by a single parasitic element. The multiple resonance sections may include an open-ended slot antenna section that resonates within 2.4 GHz frequency band, for example. The antenna system may also include a monopole antenna section that resonates within a high frequency band (HB) of 5 GHz to 7 GHz, and a dipole antenna section that also resonates within the high frequency band (HB), for example. The dipole antenna may be arranged as a floating dipole that is created by locating the open-ended slot antenna parallel to the monopole antenna, and by having them share the same electrical feed. The multiple resonance sections may be simultaneously electrically fed via a coupling with a single parasitic element.

Figure 3B:
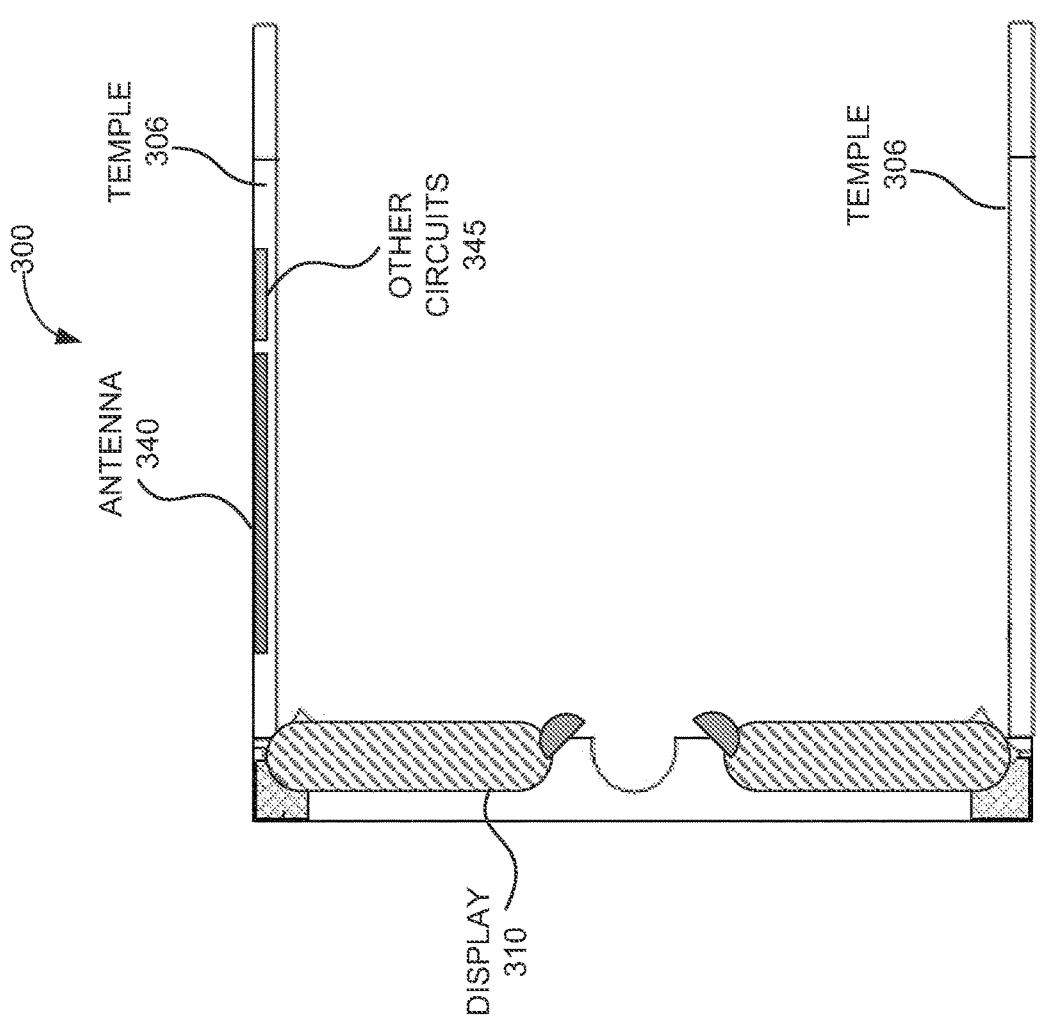

FIG. 3B is a top view of a near-eye display device 300 in the form of a pair of glasses (or other similar eyewear), according to an example. In some examples, the near-eye display device 300 may include a frame 305 and temples 306 having a form factor of a pair of eyeglasses. The frame 305 supports, for each eye: a fringe projector such as any fringe projector variant considered herein, a display 310 to present content to an eye box, an eye tracking camera, and one or more illuminators. The illuminators may be used for illuminating an eye box, as well as, for providing glint illumination to the eye. The fringe projector may provide a periodic fringe pattern onto a user's eye. The display 310 may include a pupil-replicating waveguide to receive the fan of light beams and provide multiple laterally offset parallel copies of each beam of the fan of light beams, thereby extending a projected image over the eye box.

In some examples, the pupil-replicating waveguide may be transparent or translucent to enable the user to view the outside world together with the images projected into each eye and superimposed with the outside world view. The images projected into each eye may include objects disposed with a simulated parallax, so as to appear immersed into the real-world view.

The eye tracking camera may be used to determine position and/or orientation of both eyes of the user. Once the position and orientation of the user's eyes are known, a gaze convergence distance and direction may be determined. The imagery displayed by the display 310 may be adjusted dynamically to account for the user's gaze, for a better fidelity of immersion of the user into the displayed augmented reality scenery, and/or to provide specific functions of interaction with the augmented reality. In operation, the illuminators may illuminate the eyes at the corresponding eye boxes, to enable the eye tracking cameras to obtain the images of the eyes, as well as to provide reference reflections. The reflections (also referred to as "glints") may function as reference points in the captured eye image, facilitating the eye gazing direction determination by determining position of the eye pupil images relative to the glints. To avoid distracting the user with illuminating light, the latter may be made invisible to the user. For example, infrared light may be used to illuminate the eye boxes.

In some examples, the image processing and eye position/orientation determination functions may be performed by a central controller, not shown, of the near-eye display device
300. The central controller may also provide control signals
to the display 310 to generate the images to be displayed to
the user, depending on the determined eye positions, eye
orientations, gaze directions, eyes vergence, etc.

Diagram 300B shows the antenna system 340 at an
outside surface of the temple 306 and example circuits 345
of the electronic subsystems of the near-eye display device
300. Some of those circuits 345 may provide signals for
communicating with other devices and/or networks to the
antenna system 340.

Figure 4A:
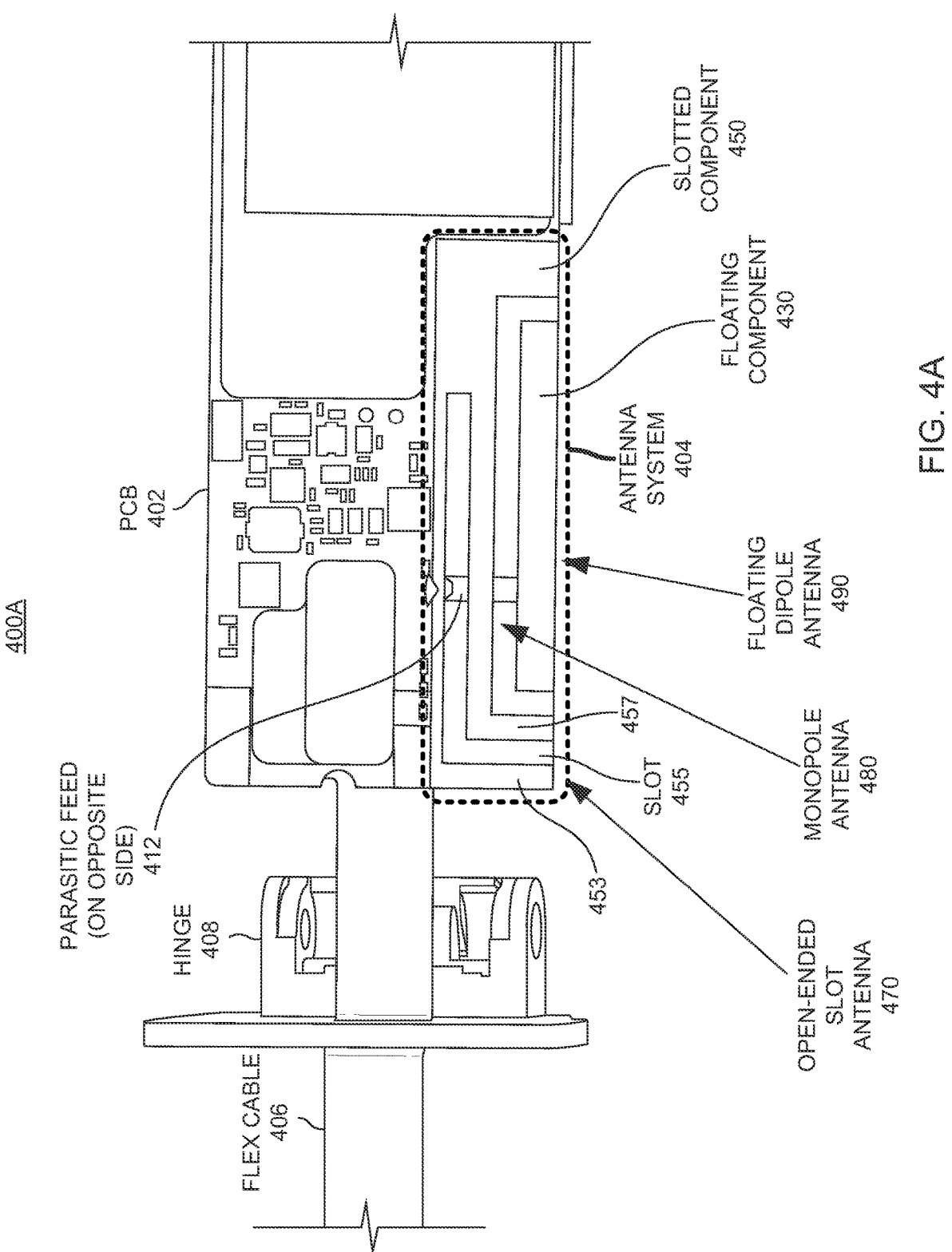
FIGS. 4A and 4B illustrate a top view and a bottom view of a compact multiband antenna system in a near-eye display device, according to an example.
Figure 4B:
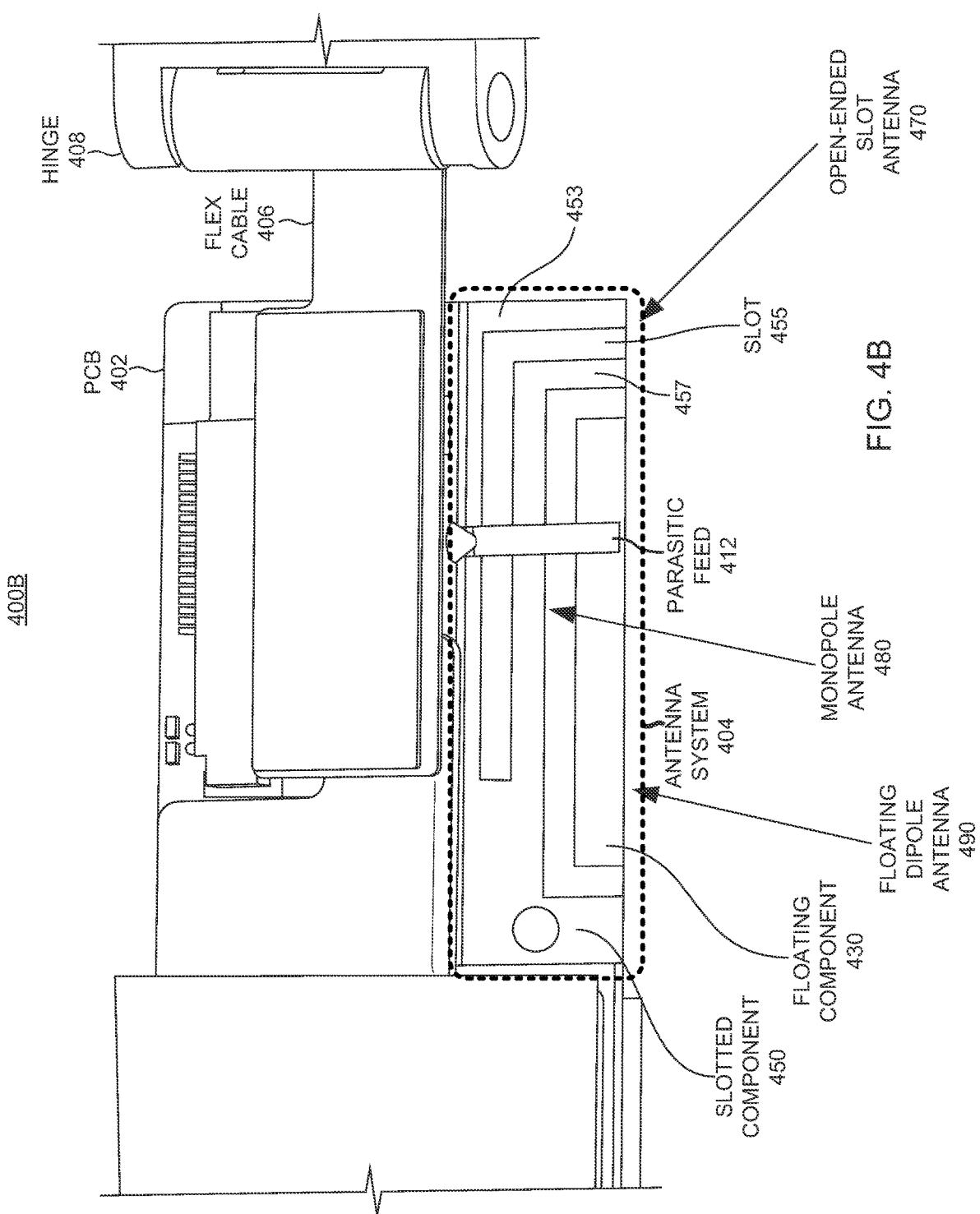
Figure 5A:
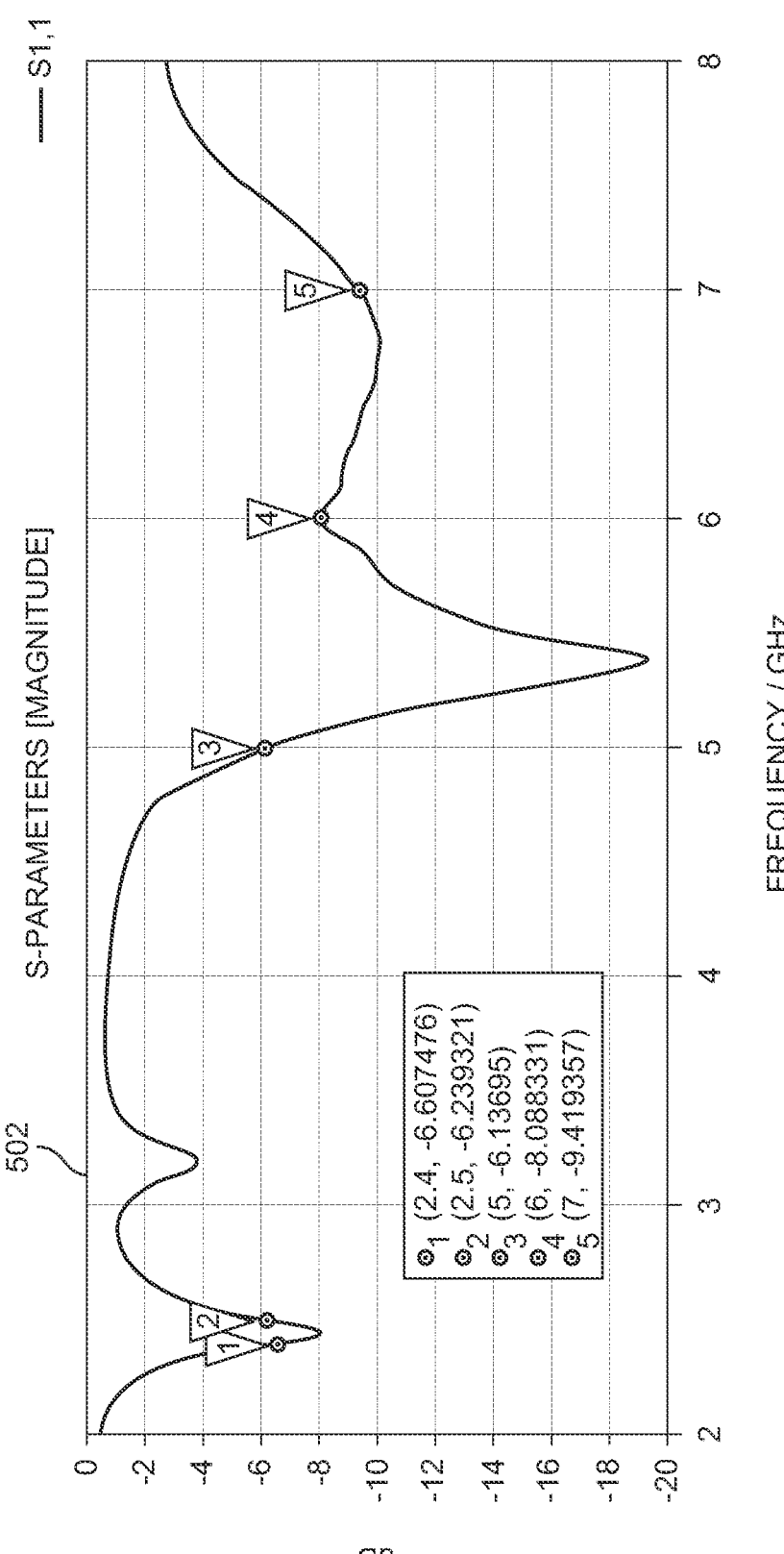
FIGS. 5A-5D illustrate antenna performance graphs of a compact multiband antenna system in a near-eye display device, according to examples.
Figure 5B:
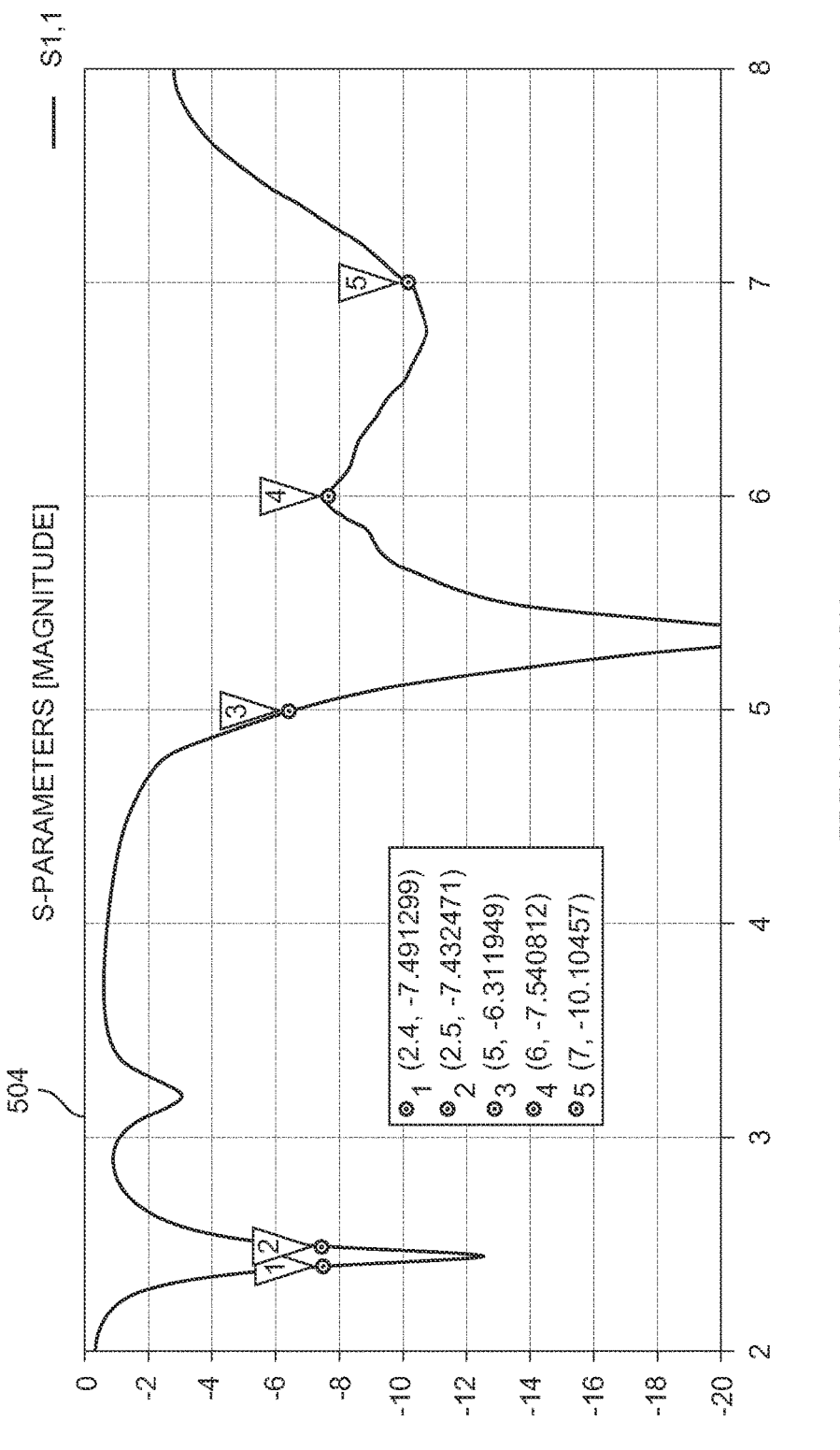
Figure 5C:
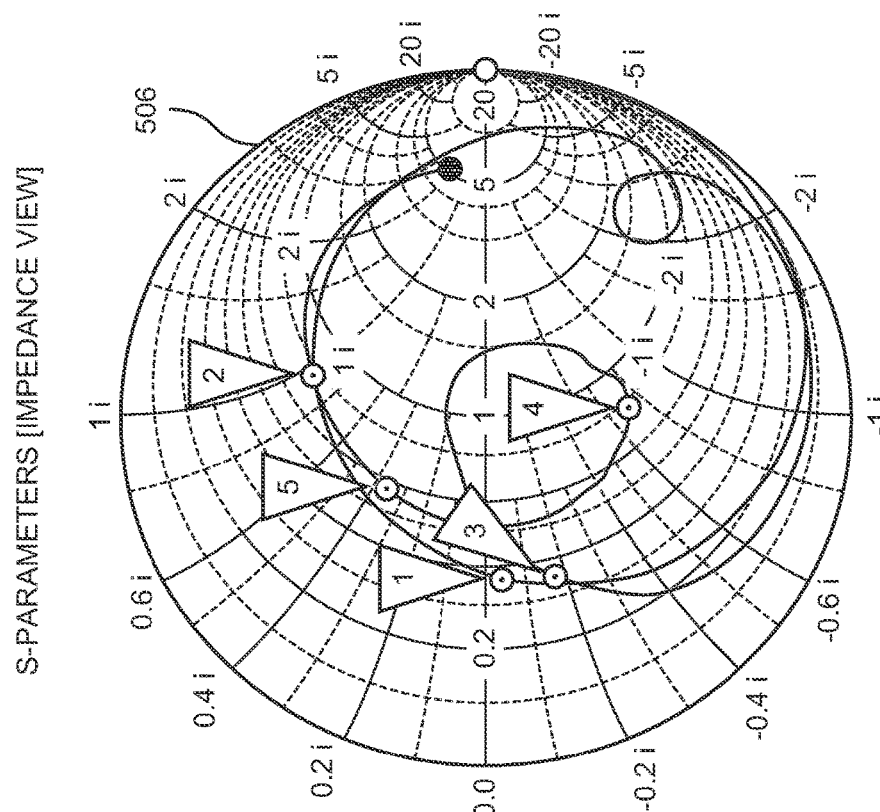
Figure 5C:
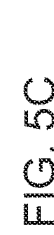
Figure 5D:
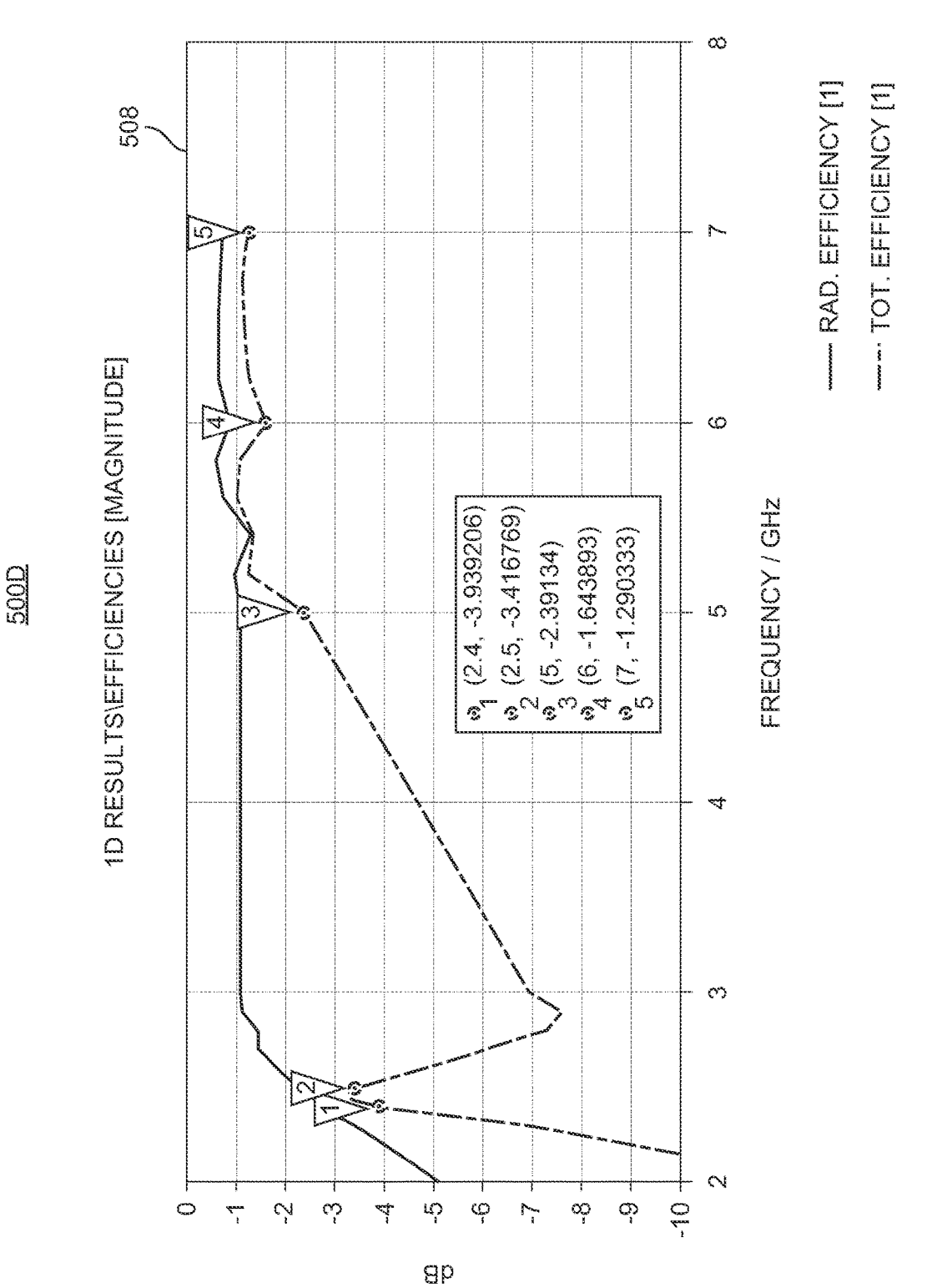

FIGS. 4A and 4B illustrate a top view and a bottom view
of a compact multiband antenna system in a near-eye display
device, according to an example. Diagrams 400A and 400B
show opposite sides of a printed circuit board (PCB) 402,
which may be placed in a temple of a near-eye display
device. The diagrams also show a flex cable 406 providing
data and control signal exchange with other circuits in the
near-eye display device, where the flex cable 406 passes
through a hinge 408 of the near-eye display device. The
different parts forming an antenna system 404 are shown
within a bounded dashed line box in FIGS. 4A and 4B. On
one surface of the printed circuit board (PCB) 402, different
parts of the antenna system 404 may be formed as shown in
diagram 400A. On an opposite surface of the printed circuit
board (PCB) 402, a parasitic feed 412 coupling to the
different parts of the antenna system 404 may be formed as
shown in diagram 400B.

There are, however, several challenges in antenna con-
figuration for near-eye display devices. For example, the
antenna volume needs to be as small as possible to fit
suitable parts (e.g., temples) of the augmented reality (AR)/
virtual reality (VR) glasses. The antenna(s) may need to
have sufficient bandwidths to cover the implemented fre-
quency bands such as 2.4 GHz, 5.15 GHz to 7.15 GHz. An
antenna efficiency may need to be optimized taking into
account an impact of the human head. Specific absorption
rate (SAR) may need to be minimized to maximize the
conducted power, thereby translating to a wireless range.
Conventional near-eye display device antennas have mul-
tiple resonant structures. It is not easy to feed all of them and
have them work together to achieve continuous staggered
resonances. Furthermore, such systems may be sensitive to
manufacturing tolerances.

As discussed herein, the small size limitation on antenna
(s) in a near-eye display device may result in lower effi-
ciency as compared to antennas with a larger antenna
volume. The antenna system 404 may provide comparable
antenna efficiency and bandwidth in a smaller antenna
volume.

The antenna system 404 may include an open-ended slot
antenna, a monopole antenna, and a floating dipole antenna,
all three fed by a single parasitic element (parasitic feed
412). More specifically, as shown in FIGS. 4A and 4B, the
antenna system 404 may include a floating component 430
and a slotted component 450, where the parasitic feed 412
extends over both components. The slotted component 450
may have an L-shaped slot 455 which opens out from the
antenna system 404, thereby defining a 1$^{st}$ extension 453 and
a 2$^{nd}$ extension 457 in the slotted component 450. Roughly
speaking, the inner portions of the 1$^{st}$ extension 453 and the
2$^{nd}$ extension 457 around the slot 455 in the slotted com-
ponent 450 may approximately constitute an open ended slot
antenna 470. Similarly roughly speaking, the portion of the
2$^{nd}$ extension 457 facing the the floating component 430
may approximately constitute a monopole antenna 480. A
floating dipole antenna 490 may be constituted by the floating component 430. The open-ended slot antenna 470
may resonate at 2.4-2.5 GHZ and the monopole antenna 480
may resonate at 7-8 GHZ. The coupling from the floating
dipole antenna 490 may lower the high frequency bandwidth
(HB) resonance of the monopole antenna 480 from 7-8 GHz
to 6-7 GHz. The floating dipole antenna 490 may also
resonate at 5-6 GHz.

A parasitic element in an antenna system is an element
which depends on another element's feed not having its own
galvanically coupled feed. Hence, parasitic elements are not
directly connected to the feed element and increase the
antenna system's radiation indirectly. In the example of
FIGS. 4A and 4B, the floating dipole antenna 490 in the
antenna system 404 may be arranged as a floating dipole that
is created by locating the open-ended slot antenna 470
parallel to the monopole antenna 480, and by having them
share the same electrical feed, thereby reducing the high
band resonance of the monopole antenna 480 from between
7-8 GHz to between 6-7 GHz. Thus, each of the resonant
antenna sections is fed simultaneously through coupling, as
opposed to each antenna element being fed directly and
coupled to a parasitic element for an additional resonance. In
some examples, the length of the antenna system 404 may
be approximately 20 mm and the width 5 mm.

FIGS. 5A-5D illustrate antenna performance graphs of a
compact multiband antenna system in a near-eye display
device, according to examples. Diagram 500A shows S-pa-
rameter (S$_{1,1}$) magnitude vs. frequency plot 502 for the
antenna system 404 in FIG. 4A. For the S-parameter plot,
the slot antenna is loaded with a floating monopole, the
antenna is in free space and there is no matching impedance
network.

Diagram 500B shows S-parameter (S$_{1,1}$) magnitude vs.
frequency plot 504 for the antenna system 404 in FIG. 4A
with a matching impedance network. The slot antenna is still
loaded with the floating monopole. As shown on the S-pa-
rameter (S$_{1,1}$) magnitude vs. frequency plot 504, the match-
ing impedance network makes the LB resonance deeper,
thus improving antenna performance.

Diagram 500C shows a polar antenna plot 506 the antenna
system 404 in FIG. 4A depicting S-parameters in impedance
view. As the plot shows an antenna performance for all five
example frequencies within standard communication bands
is sufficient. The plot covers a frequency range between 0 Hz
and 8 GHz.

Diagram 500D shows antenna efficiency 508 in free space
with the top curve representing radiation efficiency and
bottom curve representing total efficiency. Five example
frequencies within standard communication bands are
shown on the total efficiency curve.

Figure 6A:
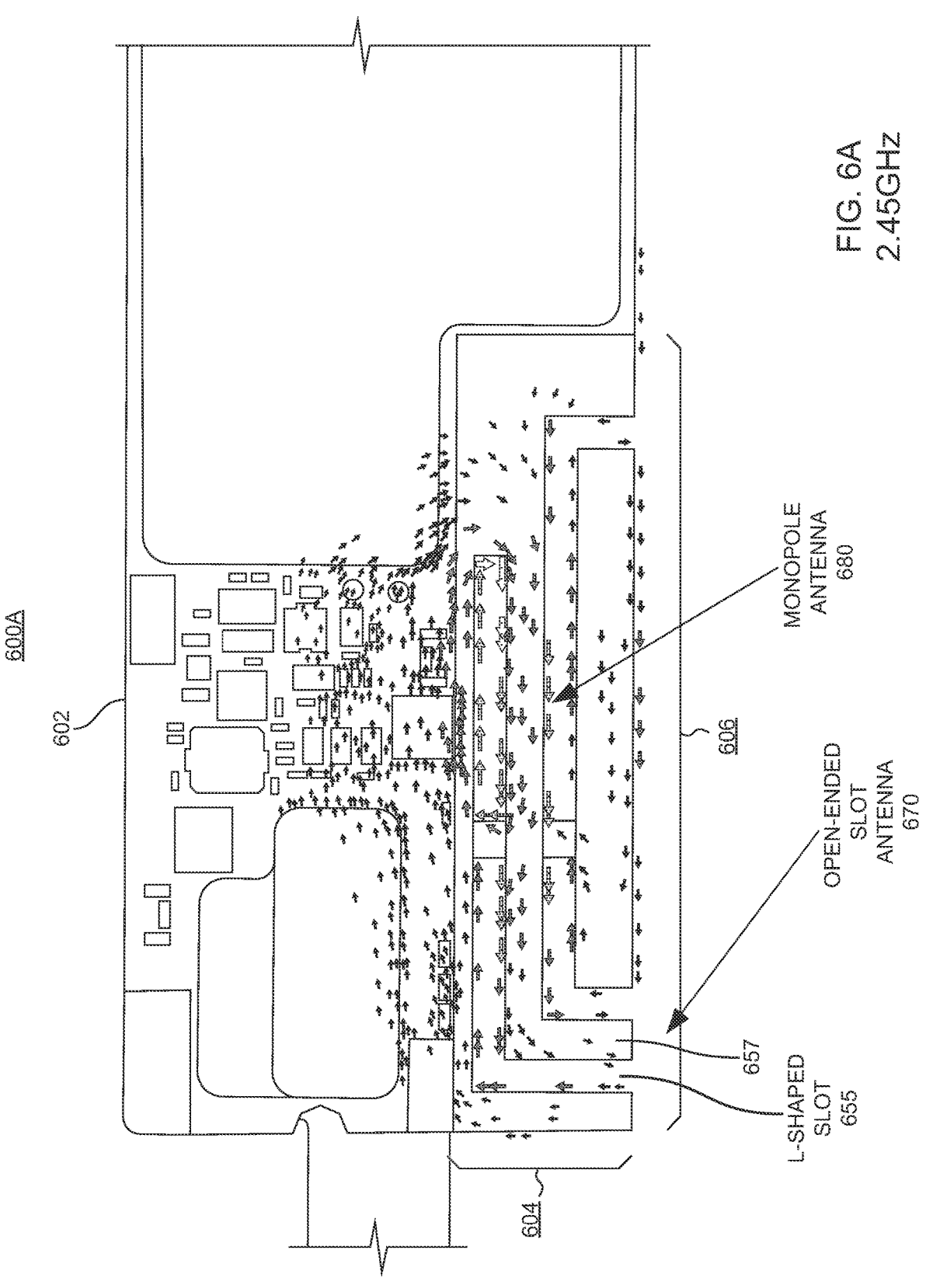
FIG. 6A illustrates current distributions in and around of a compact multiband antenna system in a near-eye display device at a transmission frequency of about 2.45 GHZ, according to an example.
Figure 6B:
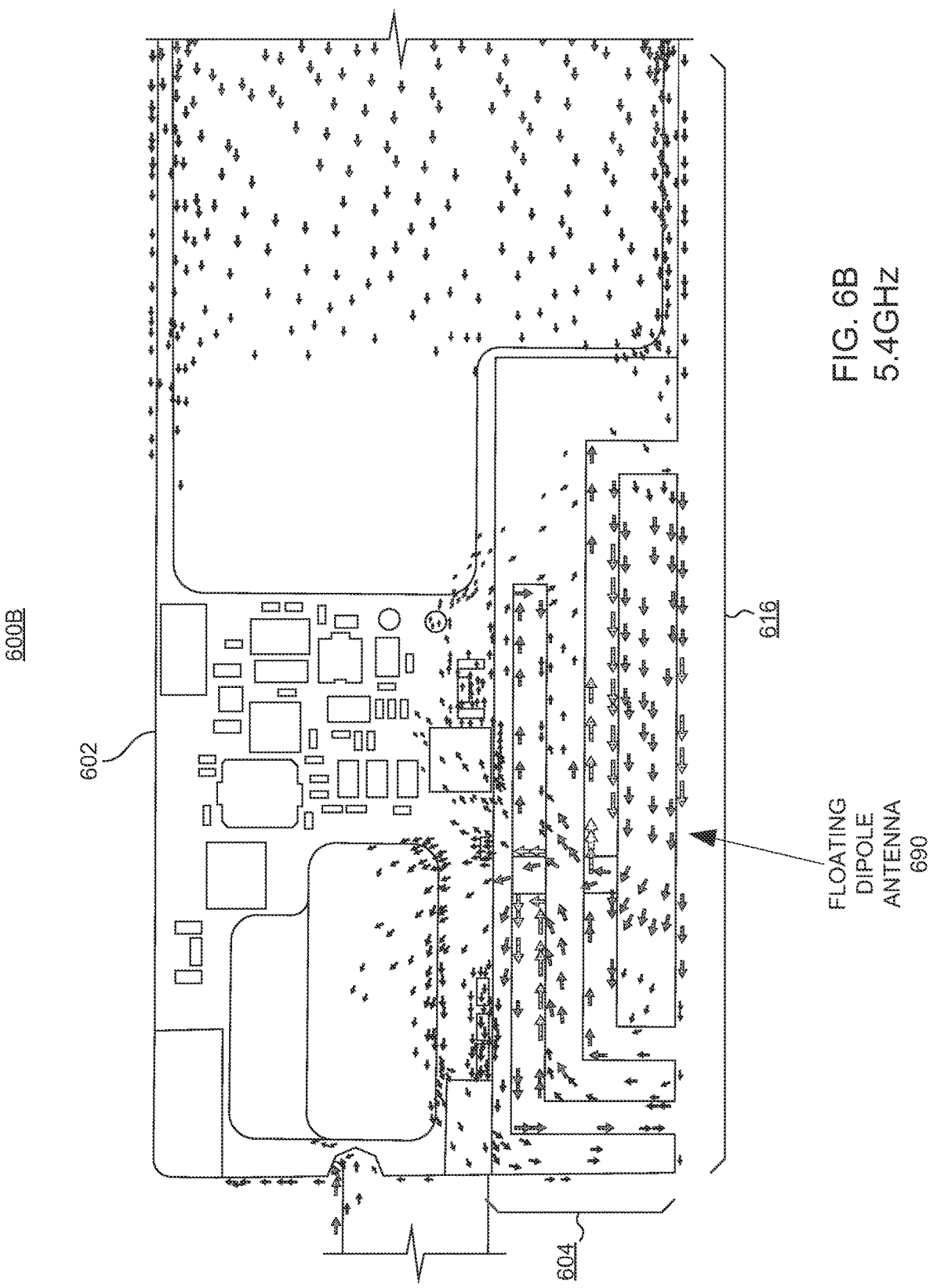
FIG. 6B illustrates current distributions in and around the compact multiband antenna system of FIGS. 4A-4B at a transmission frequency of about 5.4 GHZ, according to an example.
Figure 6C:
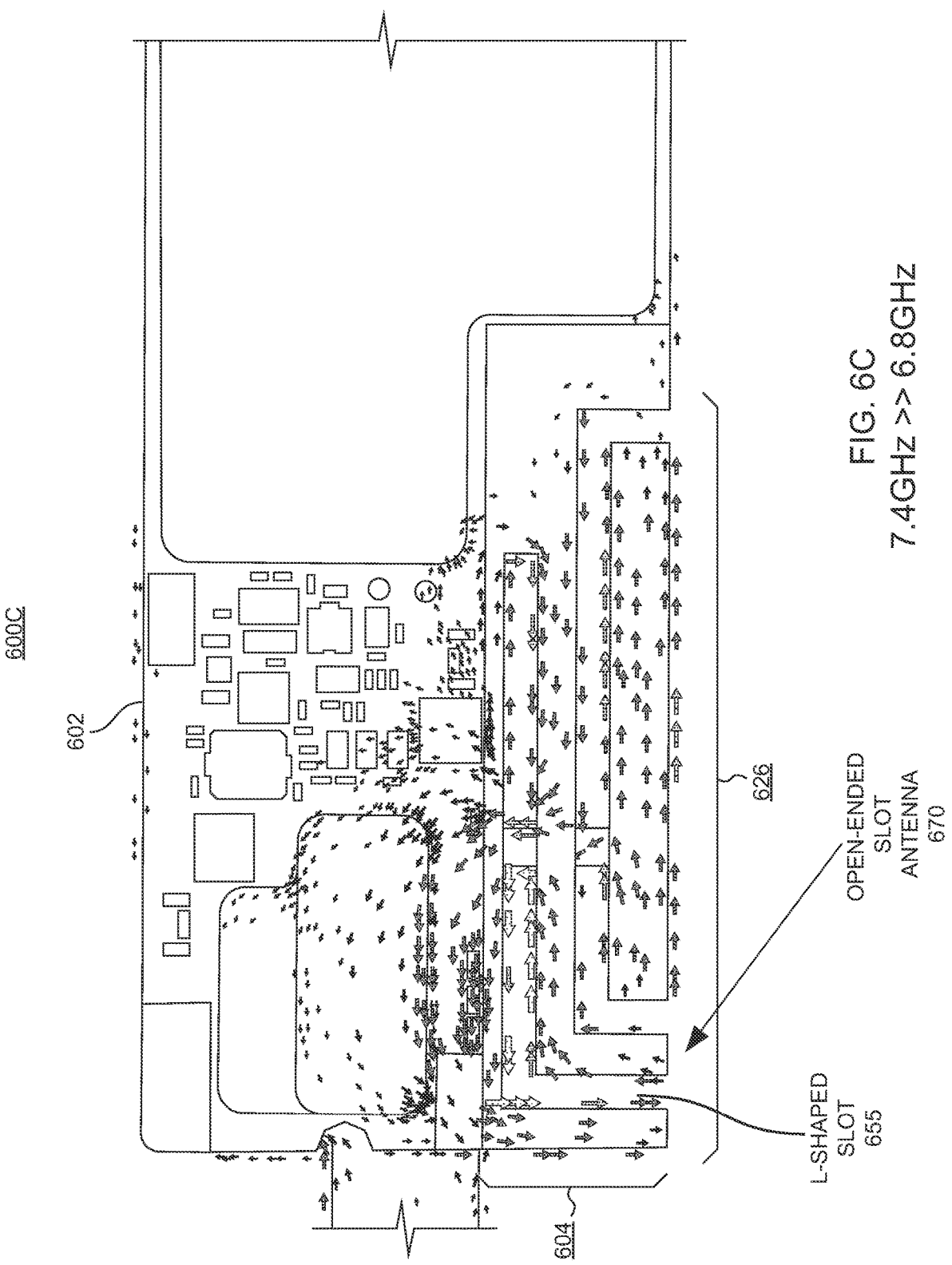
FIG. 6C illustrates current distributions in and around the compact multiband antenna system of FIGS. 4A-4B at a transmission frequency of about 6.8 GHZ, according to an example.

FIGS. 6A-6C illustrate current distributions in and around
of a compact multiband antenna system in a near-eye display
device at different transmission frequencies, according to an
example.

Diagram 600A shows current distribution 606 on and
around the antenna components 604 formed on the printed
circuit board (PCB) 602 for 2.45 GHz. Diagram 600B shows
current distribution 616 on and around the antenna compo-
nents 604 formed on the printed circuit board (PCB) 602 for
5.4 GHZ, where the current distribution extends to another
portion of the printed circuit board (PCB) 602 (first shield
portion). Diagram 600C shows current distribution 626 on
and around the antenna components 604 formed on the
printed circuit board (PCB) 602 for 6.8 GHZ, where the
current distribution extends to yet another portion of the
printed circuit board (PCB) 602 (second shield portion).

As shown in the diagram 600A of FIG. 6A, the current at a transmission frequency of 2.45 GHz is mainly distributed on the open-ended slot 655 with additional distribution on the parasitic monopole section around the monopole antenna 680. Thus, the 2.45 GHz resonance is mainly provided by the open-ended antenna slot section and the monopole antenna section. A maximum current is at the short edge/end of the L-shaped slot 655 and a minimum current is at the open end of the L-shaped slot 655, indicating that the antenna system at a transmission frequency of about 2.45 GHz operates mainly as the open-ended slot antenna 670 with additional current distribution indicating operation of the monopole antenna 680 on the 2$^{nd}$ extension 657.

As shown in the diagram 600B of FIG. 6B, the current distribution at a transmission frequency of 5.4 GHz is distributed along the floating dipole antenna 490 and is also coupled from the slot section and the parasitic monopole section, which also resonates at 5.4 GHz.

As shown in the diagram 600C of FIG. 6C, a transmission frequency of 7.4 GHz is pulled down to 6.8 GHz with a current distribution concentrating mainly in the L-shaped slot 655 by the triple harmonics of the 2.45 GHz resonance coupled with the parasitic monopole, resulting in operation of the open ended slot antenna 670.

Figure 7:
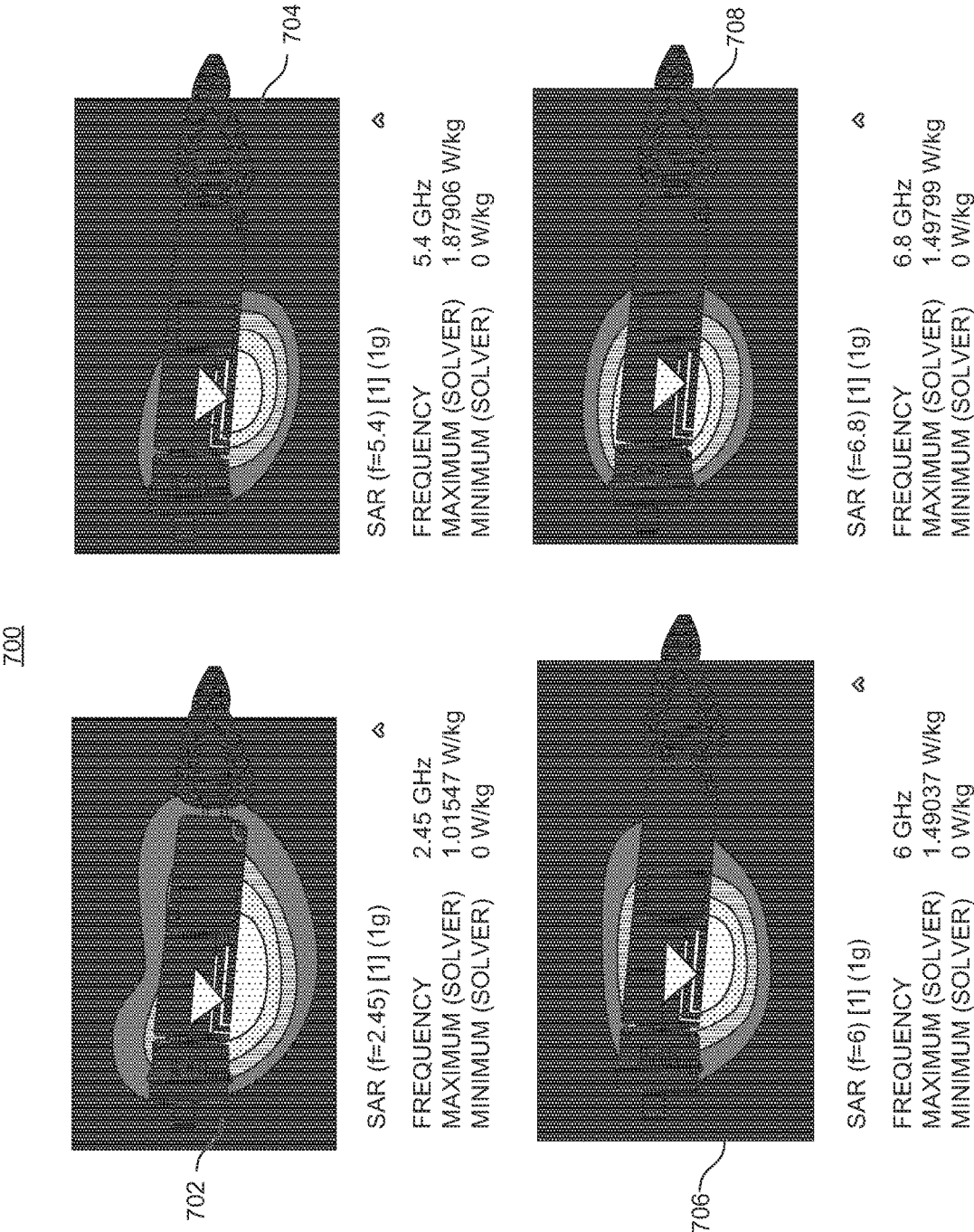
FIG. 7 illustrates specific absorption rate (SAR) graphs of a compact multiband antenna system in a near-eye display device at different transmission frequencies, according to an example.

FIG. 7 illustrates specific absorption rate (SAR) graphs of a compact multiband antenna system in a near-eye display device at different transmission frequencies, according to an example.

Specific absorption rate (SAR) is a measure of the rate of radio frequency (RF) energy absorption by the (human) body from a source being measured, for example a near-eye display device. The specific absorption rate (SAR) is used by regulatory agencies to define safety limits. A shape, directionality, distance from head, etc. of the antenna system may impact the specific absorption rate (SAR) value for any given transmission frequency.

Diagram 700 shows four different specific absorption rate (SAR) plots 702, 704, 706, and 708 of a near-eye display device with the example antenna system of FIGS. 4A and 4B at 2.45 GHZ, 5.4 GHZ, 6 GHZ, and 6.8 GHZ, respectively. Simulated specific absorption rate (SAR) values for those frequencies are, respectively, 1.01547 W/kg, 1.87906 W/kg, 1.49037 W/kg, and 1.49799 W/kg, all under the current safety limit of 2 W/kg imposed by the Federal Communications Commission (FCC) and other regulatory agencies.

According to examples, a method of making a near-eye display device with a compact multiband antenna system is described herein. A system of making the near-eye display device with a compact multiband antenna system is also described herein. A non-transitory computer-readable storage medium may have an executable stored thereon, which when executed instructs a processor to perform the methods described herein.

In the foregoing description, various examples are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples.

The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

The invention claimed is:

1. An antenna system for a near-eye device, the antenna system comprising:
an open-ended slot antenna section;
a monopole antenna section;
a dipole antenna section; and
a feed element, wherein
the dipole antenna section is arranged as a floating dipole antenna,
the open-ended slot antenna section, the monopole antenna section, and the dipole antenna section provide multiple resonance sections, and
the antenna system is integrated into a temple of the near-eye device.

2. The antenna system of claim 1, wherein the dipole antenna section is arranged as the floating dipole antenna by locating the open-ended slot antenna section parallel to the monopole antenna section and by having the open-ended slot antenna section and the monopole antenna section share the feed element as a parasitic feed.

3. The antenna system of claim 2, wherein the parasitic feed is arranged to feed the monopole antenna section, and the dipole antenna section.

4. The antenna system of claim 1, wherein
the open-ended slot antenna section is to resonate within about a 2.4 GHz frequency band,
the monopole antenna section is to resonate within a frequency band of about 5 GHz to about 7 GHZ, and
the dipole antenna section is also to resonate within the frequency band of about 5 GHz to about 7 GHz.

5. The antenna system of claim 4, wherein the floating dipole antenna is to reduce its resonance from a generated frequency of between about 7 GHz and about 8 GHz to a transmission frequency between about 6 GHZ and about 7 GHz.

6. The antenna system of claim 1, wherein
the open-ended slot antenna section, the monopole antenna section, and the dipole antenna section are formed on one surface of a printed circuit board (PCB), and
the feed element is formed on an opposite surface of the printed circuit board (PCB).

7. The antenna system of claim 1, wherein the antenna system has a length of about 20 mm and a width of about 5 mm.

8. The antenna system of claim 1, wherein the near-eye device is a near-eye display device.

9. The antenna system of claim 8, wherein the near-eye display device is at least one of an augmented reality (AR), virtual reality (VR), or mixed reality (MR) near-eye display device.

10. A near-eye device, comprising:
a frame;
two temples coupled to the frame; and
an antenna system integrated into one or both of the two temples, the antenna system comprising:
an open-ended slot antenna section;
a monopole antenna section;
a dipole antenna section; and
a feed element, wherein
the dipole antenna section is arranged as a floating dipole antenna, and
the open-ended slot antenna section, the monopole antenna section, and the dipole antenna section provide multiple resonance sections.

11. The near-eye device of claim 10, wherein the dipole antenna section is arranged as the floating dipole antenna by locating the open-ended slot antenna section parallel to the monopole antenna section and by having the open-ended slot antenna section and the monopole antenna section share the feed element as a parasitic feed.

12. The near-eye device of claim 11, wherein the parasitic feed is arranged to feed the monopole antenna section, and the dipole antenna section.

13. The near-eye device of claim 10, wherein
the open-ended slot antenna section is to resonate within about a 2.4 GHz frequency band,
the monopole antenna section is to resonate within a frequency band of about 5 GHz to about 7 GHZ, and
the dipole antenna section is also to resonate within the frequency band of about 5 GHz to about 7 GHz.

14. The near-eye device of claim 13, wherein the floating dipole antenna is to reduce the resonance from a transmitted frequency of between about 7 GHz and about 8 GHz to a transmission frequency between about 6 GHZ and about 7 GHZ.

15. The near-eye device of claim 10, wherein
the open-ended slot antenna section, the monopole antenna section, and the dipole antenna section are formed on one surface of a printed circuit board (PCB), and the feed element is formed on an opposite surface of the printed circuit board (PCB).

16. The near-eye device of claim 10, wherein the antenna system has a length of about 20 mm and a width of about 5 mm.

17. The near-eye device of claim 10, wherein the near-eye device is a near-eye display device.

18. The near-eye device of claim 17, wherein the near-eye display device is at least one of an augmented reality (AR), virtual reality (VR), or mixed reality (MR) near-eye display device.

19. An antenna system for a near-eye device, the antenna system comprising:
a Printed Circuit Board (PCB) comprising:
a first flat surface comprising:
an open-ended slot antenna section;
a monopole antenna section;
a dipole antenna section; and
a second flat surface opposite the first flat surface, comprising:
a feed element,
wherein the dipole antenna section is arranged as a floating dipole antenna by locating the open-ended slot antenna section parallel to the monopole antenna section and by having the open-ended slot antenna section and the monopole antenna section share the feed element as a parasitic feed, and
wherein the open-ended slot antenna section, the monopole antenna section, and the dipole antenna section provide multiple resonance sections.

20. The antenna system of claim 19, wherein
the open-ended slot antenna section is to resonate within about a 2.4 GHz frequency band,
the monopole antenna section is to resonate within a frequency band of about 5 GHz to about 7 GHZ, and
the dipole antenna section is to reduce its resonance within the frequency band of about 5 GHz to about 7 GHz from a generated frequency of between about 7 GHz and about 8 GHz to a transmission frequency between about 6 GHZ and about 7 GHZ.

* * * * *